Patented Dec. 27, 1932

1,892,577

UNITED STATES PATENT OFFICE

GEORG KALISCHER, OF FRANKFORT-ON-THE-MAIN, GERMANY, ASSIGNOR TO GENERAL ANILINE WORKS, INC., OF NEW YORK, N. Y., A CORPORATION OF DELAWARE

DERIVATIVES OF AMINO-NAPHTHOL SULPHONIC ACIDS

No Drawing. Application filed June 8, 1932, Serial No. 616,157, and in Germany October 4, 1928.

My present invention relates to new derivatives of aminonaphthol sulphonic acids corresponding probably to the general formula

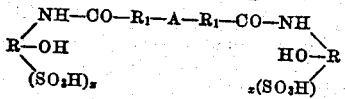

wherein R represents a naphthalene radicle, $R_1$ a phenyl radicle which may contain further substituents, A stands for the group

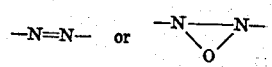

and $x$ means the number 1 or 2.

The new compounds are obtained by subjecting the corresponding nitro-aroyl-aminonaphthol sulphonic acids to a reduction process in an alkaline medium by means of for instance glucose, arsenious acid, zinc dust, sodium sulfide or formaldehyde.

The new compounds do not contain any primary amino-group. They represent weakly yellowish colored substances and are distinguished by an excellent affinity to the vegetable fiber yielding when combined with diazo-compounds on the fiber or in substance very intense dyestuffs of full, clear and fast shades.

The technical value of the present new products and of the process of making same is involved by the fact that initial products of no affinity to the vegetable fiber are converted into compounds having a pronounced affinity and being therefor capable of being fixed by the vegetable fiber like direct cotton dyestuffs.

In order to further illustrate my invention the following examples are given, the parts being by weight and all temperatures in centigrade degrees, but it is understood, that my invention is not limited to the particular products nor reacting conditions mentioned therein:

Example 1

38.8 parts of 4'-nitrobenzoyl-2-amino-5-naphthol-7-sulphonic acid are dissolved in 30 parts of a caustic soda solution of 40° Bé. and about 800 parts of water. The solution is warmed to about 70° C. and then a solution of 16 parts of dextrose in about 100 parts of water is added the temperature being kept for about an hour at 70-75°. The yellowish solution thus obtained is neutralized with hydrochlorid acid and the reduction compound is isolated as sodium salt by adding sodium chloride to the aforesaid solution.

The new compound which corresponds to the probable formula

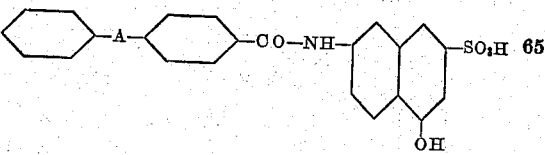

wherein A stands for the group

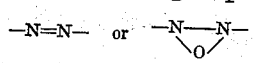

respectively represents in the form of the free acid yellowish flakes which are insoluble in water. The alkali metal salts are easily soluble in hot water with a yellow color. The new compound dissolves in concentrated sulphuric acid with an intense brownish orange color. The new compound dyes cotton weakly yellow tints.

Compounds of similar properties are obtained when subjecting 4'-nitro-2'-chlorobenzoyl-2-amino-5-naphthol-7-sulphonicacid or 3'-nitro-benzoyl-2-amino-5-naphthol-7-sulphonic acid to the same reduction process.

Example 2

When reducing in the manner as described in Example 1 4'-nitro-benzoyl-2-amino-8-naphthol-6-sulphonic acid the new reduction compound corresponding probably to the formula

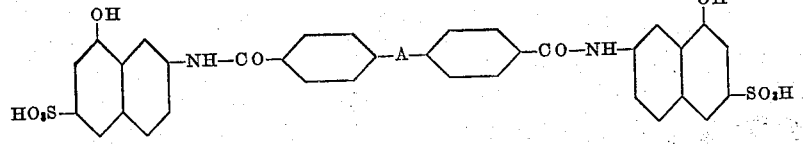

wherein A stands for the group

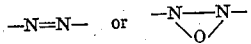

respectively is very similar in its properties with the products described in Example 1, but yielding when combined with diazocompounds more bluish dyestuffs.

The 4'-nitro-3'-chloro-benzoyl-2-amino-8-naphthol-6-sulphonic acid and the 4'-nitro-3'-methoxy-benzoyl-2-amino-8-naphthol-6-sulphonic acid can be likewise converted into reduction compounds of similar properties.

Example 3

49 parts of the monosodium salt of the 4'-nitro-benzoyl-1-amino-8-naphthol-3.6-disulphonic acid are dissolved in 35 parts of a caustic soda lye of 40° Bé. and about 600 parts of hot water. Then a solution of 16 parts of dextrose in about 100 parts of water is added and the mixture is heated for about an hour at 70–75°. By adding hydrochloric acid the formed reduction product is isolated in the form of reddish yellow flakes. The new compound corresponding probably with the formula

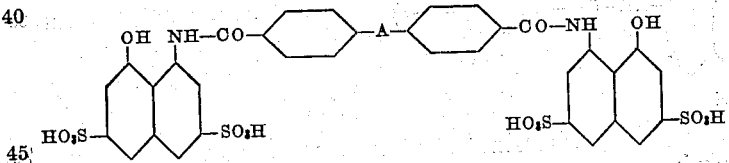

wherein A stands for the group

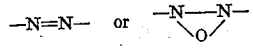

respectively is soluble in water with a yellowish color, in concentrated sulphuric acid with a reddish yellow color. It combines with two molecules of diazo-compounds to direct cotton dyestuffs.

The same product is obtained when replacing the 16 parts of dextrose by 15 parts of zinc dust or 12 parts of sodium sulphide and by carrying out the reaction while moderately warming the reaction mass.

I claim:

1. Derivatives of amino-naphthol sulphonic acids corresponding probably to the general formula

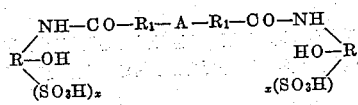

wherein R represents a naphthalene radicle, $R_1$ a phenyl radicle which may contain a further substituent of the group consisting of halogen and alkoxy, A stands for the group

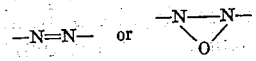

and $x$ means the number 1 or 2, which products represent weakly yellowish colored substances and are distinguished by an excellent affinity to the vegetable fiber yielding when combined with diazo-compounds on the fiber or in substance very intense dyestuffs of full, clear and fast shades.

2. Derivatives of amino-naphthol sulphonic acids corresponding probably to the general formula

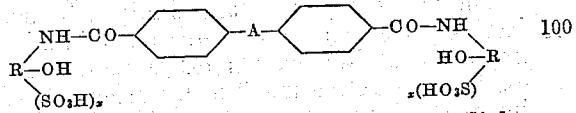

wherein R represents a naphthalene radicle, A stands for the group

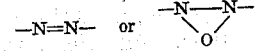

and $x$ means the number 1 or 2, which products represent weakly yellowish colored substances and are distinguished by an excellent affinity to the vegetable fiber yielding when combined with diazo-compounds on the fiber or in substance very intense dyestuffs of full, clear and fast shades.

3. A derivative of 2-amino-5-naphthol-7-sulphonic acid corresponding probably to the formula

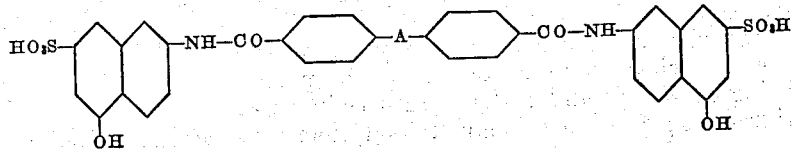

wherein A stands for the group

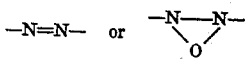

respectively, which product represents in the form of the free acid yellowish flakes which are insoluble in water, forming alkali metal salts which are easily soluble in hot water with a yellow color, which product is soluble in concentrated sulphuric acid with an intense brownish orange color and dyes cotton weakly yellow tints.

4. A derivative of 2-amino-8-naphthol-6-sulphonic acid corresponding probably to the formula

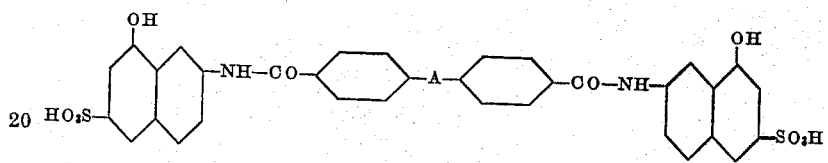

wherein A stands for the group

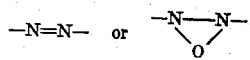

respectively which product represents in the form of the free acid yellowish flakes which are insoluble in water, forming alkali metal salts which are easily soluble in hot water with a yellow color, which product is soluble in concentrated sulphuric acid with an intense brownish orange color and dyes cotton weakly yellow tints.

5. A derivative of 1-amino-8-naphthol-3.6-disulphonic acid corresponding probably to the formula

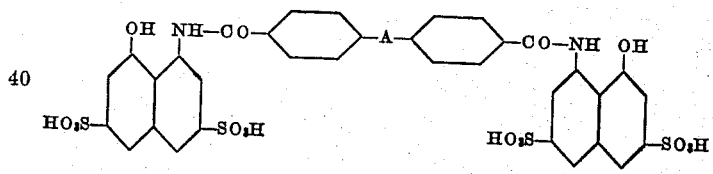

wherein A stands for the group

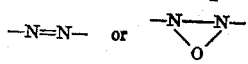

respectively which product dissolves in water with a yellowish color and in concentrated sulphuric acid with a reddish yellow color and combines with two molecular properties of diazo-compounds to direct cotton dyestuffs.

In testimony whereof, I affix my signature.
GEORG KALISCHER.